United States Patent [19]
Eikill et al.

[11] Patent Number: 5,131,085
[45] Date of Patent: Jul. 14, 1992

[54] HIGH PERFORMANCE SHARED MAIN STORAGE INTERFACE

[75] Inventors: Richard G. Eikill; Sheldon B. Levenstein, both of Rochester, Minn.

[73] Assignee: International Business Machines Corporation, Armonk, N.Y.

[21] Appl. No.: 445,320

[22] Filed: Dec. 4, 1989

[51] Int. Cl.⁵ .................................. G06F 13/36
[52] U.S. Cl. ........................... 395/325; 364/DIG. 1; 364/228.1; 364/228.3; 364/229.2; 364/230.4; 364/240.1
[58] Field of Search .................. 364/200 MS File

[56] References Cited

U.S. PATENT DOCUMENTS

| | | | |
|---|---|---|---|
| 4,223,380 | 9/1980 | Antonaccio et al. | 364/200 |
| 4,314,335 | 2/1982 | Pezzi | 364/200 |
| 4,375,639 | 3/1983 | Johnson, Jr. | 364/200 X |
| 4,481,572 | 11/1984 | Ochsner | 364/200 |
| 4,504,906 | 4/1985 | Itaya et al. | 364/200 |
| 4,523,272 | 6/1985 | Fukunaga et al. | 364/200 |
| 4,561,051 | 12/1985 | Rodman et al. | 364/200 |
| 4,611,276 | 9/1986 | Vinot | 364/200 |
| 4,633,394 | 12/1986 | Georgiou et al. | 364/200 |
| 4,639,859 | 1/1987 | Ott | 364/200 |
| 4,665,484 | 5/1987 | Nanba | 364/200 |
| 4,698,746 | 10/1987 | Goldstein | 364/200 |
| 4,719,622 | 1/1988 | Whipple et al. | 364/200 X |
| 4,730,268 | 4/1988 | Marin | 364/900 |
| 4,803,617 | 2/1989 | Berarducci | 364/200 |

FOREIGN PATENT DOCUMENTS 60-129872 2/1985 Japan .

*Primary Examiner*—Thomas M. Heckler
*Attorney, Agent, or Firm*—Frederick W. Niebuhr; J. Michael Anglin

[57] ABSTRACT

A high performance interface joins multiple processing devices configured as masters, with multiple memory cards or other devices configured as slaves. The interface includes a working data bus for transmitting working information between the processors and memory cards. Auxiliary busses, including a command/address bus for commands and address information and a communication bus for status information, are connected to all of the processing devices and slave devices and operate in parallel with the working data bus. A system for distributing control of the working information bus, among all of the master devices and slave devices, includes a grant token and plural select tokens. The grant token, a line connected in common to all devices, permits a device currently controlling the interface to retain control until it completes its transmission. The select tokens, each connected to a uniquely associated slave device and to all of the master devices, consists of a command active line activated by a master device when providing a store or fetch command, a return data line activated by a selected master device to retrieve earlier requested data from a selected slave device, and a buffer full line whereby a slave device with its buffer occupied communicates this fact to all of the master devices. Store and fetch operations are conducted according to command transfer and return data transfer protocols, which optionally include an acknowledgement via the communication bus that a command was received during the next preceding clock cycle.

26 Claims, 6 Drawing Sheets

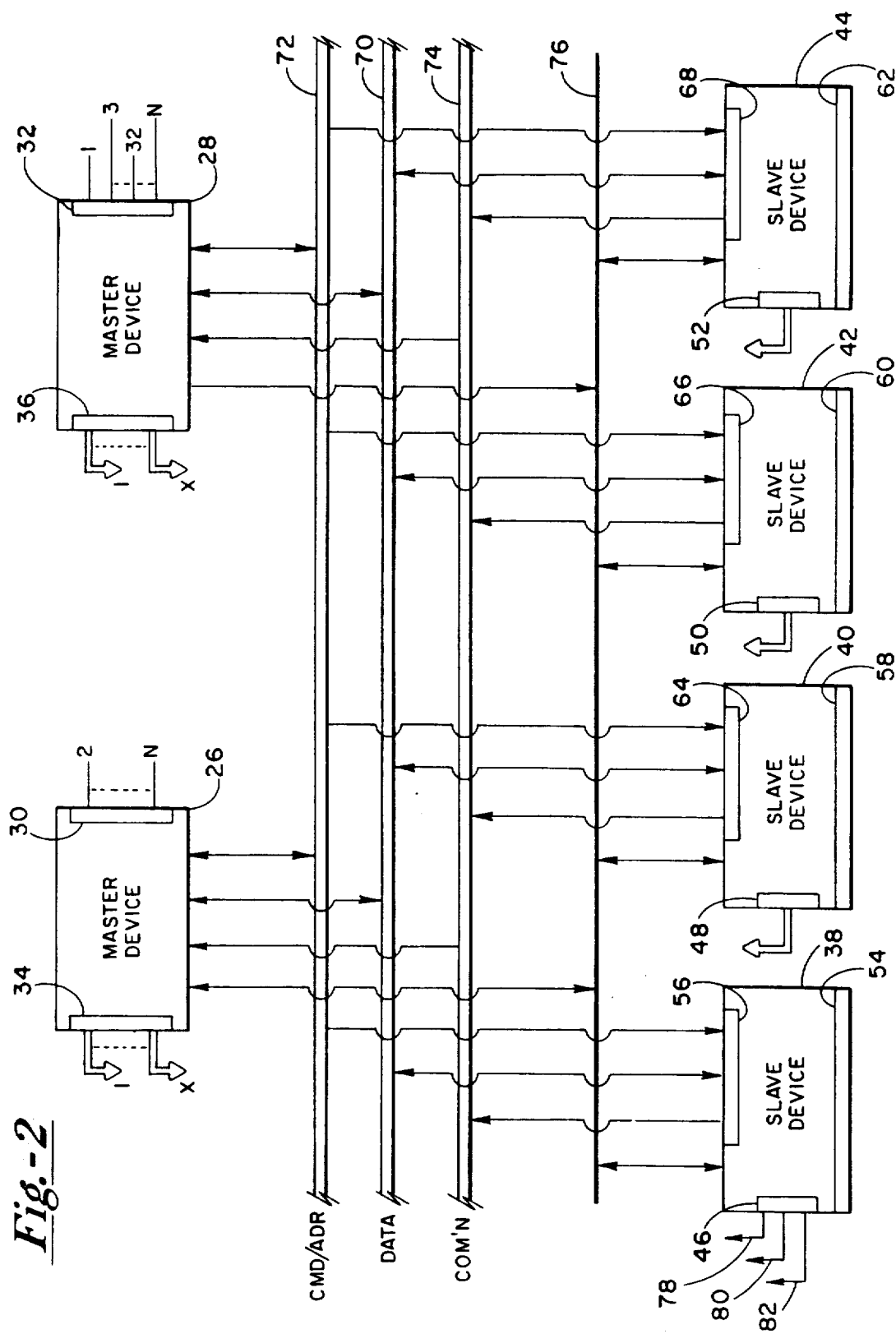

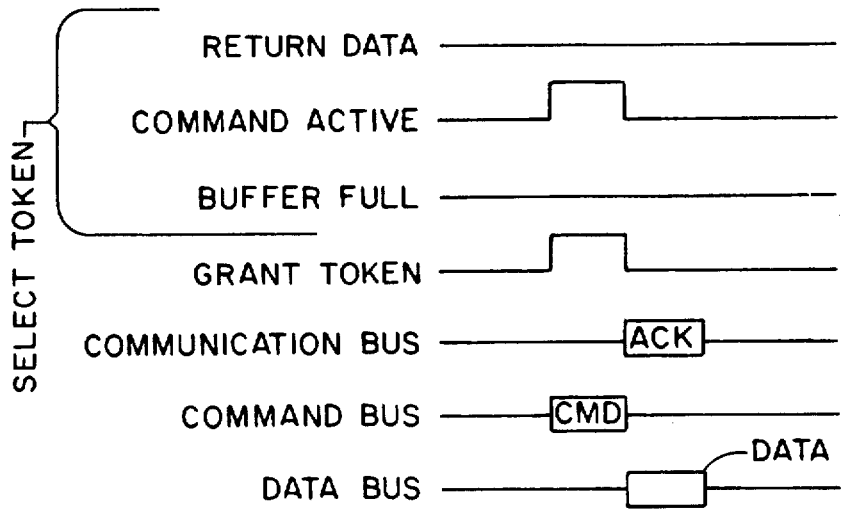
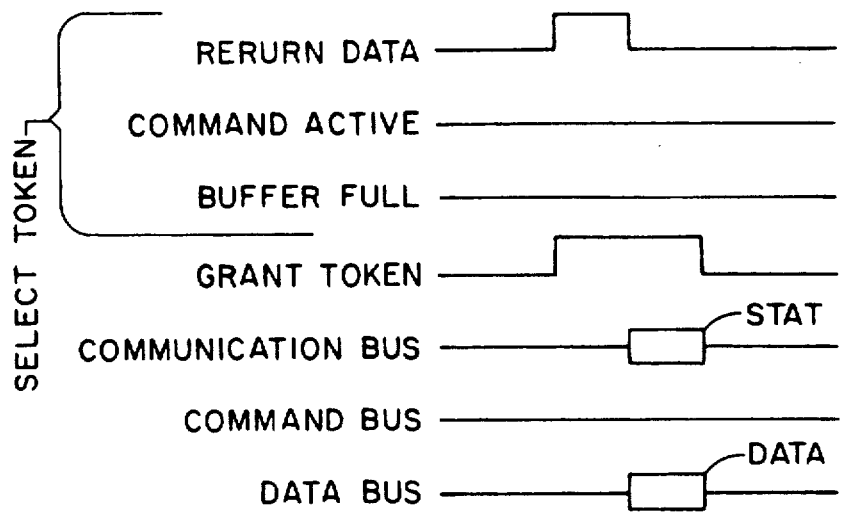

HIGH PERFORMANCE SHARED MAIN STORAGE INTERFACE

BACKGROUND OF THE INVENTION

The present invention relates to information processing systems in which a plurality of processing devices and memory devices share a common data bus, and more particularly to arrangements for distributing control of the data bus among the devices sharing it. The invention is particularly well suited for use with "smart" interfaces used by a processor sending a data request (including command and address information) to one of multiple memory cards of main storage, after which the requesting processor waits for a return of data.

Recent developments in computer system architectures show trends toward larger sizes for main storage, plural processors sharing a data bus connecting them with main storage, and increased operating speeds in the processors themselves. All of these trends call for more efficient transfer of increasing amounts of data between the processors and main memory, thus demanding improved interface design.

One such improvement involves providing separate data busses or data bus segments in the interface. For example, U.S. Pat. No. 4,375,639 (Johnson, Jr.) discloses a synchronous bus arbitration arrangement in which a communication bus includes a data bus portion including parallel data bus lines, an address bus portion and a control bus portion. Similarly, U.S. Pat. No. 4,561,051 (Rodman et al) discloses a memory bus with separate data, address and command paths shared by a number of independent processors.

Systems involving plural processors typically include arbitration schemes for determining priority of access to the bus among the processors. The aforementioned Johnson patent discloses a combination of "local" signal control lines coupled between a designated bus and a prospective user of the bus with "common" control line joined to all units in the system, for determining user priority. In U.S. Pat. No. 4,719,622 (Whipple et al), central processors, memory units and other devices share a system bus. Control of the system bus is passed in a daisy chain arrangement in which a device currently controlling the bus passes control of the bus to the next device along the chain having a need for access to the bus. U.S Pat. No. 4,730,268 (Marin) discloses a distributed arbitration scheme in which a number of processors share designation as the "master" processor, as well as control of the commonly shared data and address bus. Both bus access and arbitration mastership are determined every clock cycle, a scheme said to allow all processors to be fully pipelined, with the potential for full (100 percent) bus utilization.

Other approaches to increase interface efficiency include a combination of a content-associative write buffer and controller, disclosed in the aforementioned Rodman patent, to allow processors other than a processor currently involved in a read-modify-write procedure to gain access to the memory bus. U.S. Pat. No. 4,223,380 (Antonaccro et al.) discloses a distributed multi processor communication system in which multiple processors share a communications bus, each processor having a communications interface unit to decode communications on the bus, buffer data and transmit an acknowledgement to a sender that data has been received. Consequently these tasks are handled independently of each central processing unit.

While the above approaches have improved interface data transmission to varying degrees, a significant problem remained. The data bus of the smart interface typically is scheduled for use and then remains "busy" for the entire data transfer. The interface is thus tied up during a relatively long memory array access time, which creates a system bottleneck when multiple processors share the interface.

Therefore, it is an object of the present invention to provide an interface in which the data bus is free, during a memory array access associated with a data transfer, to handle other transmissions.

Another object of the invention is to provide a means for distributing control of a shared data bus among multiple processors and memory devices sharing the bus, while one of the devices controls the bus, to enable immediate transfer of control from the currently controlling device.

Another object of the invention is to provide an interface between multiple processing devices and multiple memory devices in which interface overhead (i.e. the control, status and address information as opposed to the working information) is hidden from the stream of working information.

Yet another object is to provide an interface between a set of processing devices configured as master devices, and a set of memory devices configured as slave devices, in which data bus control logic among all devices is employed in combination with arbitration logic for determining priority among only the master devices, and in which the function of memory array address generation resides in the memory devices.

SUMMARY OF THE INVENTION

To achieve these and other objects, there is provided an information processing system including a plurality of devices for transmitting and receiving bit-encoded working information. The system comprises a first set of devices including at least one master device, a second set of devices including at least one slave device, and an interface between the first and second sets of devices.

The interface includes a first data bus shared by the devices for carrying out transmissions of the working information between the first and second set of devices. Each of the devices, when providing working information to the first data bus during one of the transmissions, exclusively controls the first data bus.

The interface further includes a bidirectional signal conveyance means connected to the first and second sets of devices, for transmitting a data bus hold signal from one of the devices currently in control of the first data bus to the other devices, to prevent another device from controlling the first data bus until the currently controlling device has completed one of the transmissions. Further, the interface includes a selection means connected to the first and second sets of devices. The selection means permits transmissions of control signals, each from a selected one of the master devices to a selected one of the slave devices, thereby to allow transfer of control of the first data bus to one of the devices after the currently controlling device completes its transmission. The control signals include a first control signal, operative after termination of the data bus hold signal, to transfer control of the first data bus, enabling the selected master device to transmit working information to a selected slave device over the first data bus; a second control signal to enable a selected slave device to buffer working information for its subsequent transmission from a selected slave device to a selected master device; and a third control signal, operative after termination of the data bus hold signal, to pass control of the first data bus to the selected slave device via the selected master device for transmission of the previously buffered working information to the selected master device.

In the preferred network, the first set of devices includes a plurality of master devices, several of which are processors, while the second set of devices includes a plurality of slave devices, several of which are memory cards. The network preferably includes an arbitration scheme, operative only among the master devices, for determining priority of generating control signal, i.e. priority of access to the first data bus. In this connection, it is to be understood that the present invention is not an arbitration scheme, but rather suited for use in combination with an arbitration scheme to more effectively employ a shared data bus. Accordingly, the arbitration scheme can involve arbitration logic within each master device, or a single arbiter connected to all of the master devices, in either case according to practices known in the art.

Along with the first data bus, the network advantageously employs a second data bus for transmitting command and address information, and a third data bus for transmitting command received acknowledgements and other status information. The busses are connected to all of the devices, and operate in parallel.

In a particularly preferred approach, the data bus hold signal is conveyed by a single line grant token connected to all of the devices, and the selection means includes a plurality of select tokens. Each of the select tokens consists of a command active line for transmitting the first and second control signals, a return data line for transmitting the third control signal, and a buffer-full line for transmitting, from its associated slave device to all master devices, an indication that its buffer is occupied. To these ends, each select token is connected only to its associated slave device and to all of the master devices.

In accordance with the present invention, transfer of control among devices follows protocols associated with two types of commands: a storage command for the transfer of working information from a master device to a slave device, and a fetch command for transfer of data from a slave device to a master device. When a selected master device provides a store command to a selected slave device, it simultaneously provides the first control signal. The working data is transferred from the master device to the slave device on the working data bus in the next clock cycle.

A fetch operation involves three stages: an initial stage in which a fetch command is provided from a selected master to a selected slave over the second data bus and simultaneously the first control signal is provided to the selective slave device. In the second stage, the slave device accesses it memory arrays for the requested data. Finally, responsive to the third control signal over the return data line to the slave device from the master device, the slave device controls the first data bus to send the requested working information to the master device. Each memory card includes sufficient logic for processing access requests independently of processor control, thus freeing the first data bus, during the second stage of the fetch operation, to handle data unrelated to the fetch operation.

An information processing network, configured according to the present invention, offers a number of features contributing to high efficiency of the shared interface. First, use of the select and grant tokens, command/address bus and communications bus, all in support of the working data bus, effectively hides the interface overhead from the working data stream, and provides potentially 100 percent utilization of the data bus for a maximum data transfer rate. The grant and select tokens distribute control of the working data bus among all of the devices, and transfer control of this bus prior to its use. Certain simple data manipulation operations, including memory array address generation, are shifted from the processors to the memory cards. This requires a high level command set to control the memory cards, but reduces the burden on the interface. The separate command/address bus permits parallel transmission of commands and working data between two unique pairs of devices. The off-loading of storage control functions and simple operations to memory cards allows for single cycle stores to main storage, with the interface then available for further transfers while the memory card completes the store. Finally, the interface protocol allows for commands to overlap, freeing the working data bus for other transfers during the second stage of fetch.

The above features facilitate use of the working data bus at nearly 100 percent for maximum interface efficiency. They promote flexibility, in that slave devices of different types can be employed in the same network. A slave device operating at a slower rate simply holds the interface longer when return of data is requested. The only necessary conditions for the interface are that all memory cards must have the same synchronized cycle time and use compatible technologies for the bus logic, i.e. the drivers and receivers. The dual-token passing scheme substantially enhances the effectiveness of the interface in handling multiple processors and I/O devices sharing a single data path to main storage, thus substantially increasing total system performance.

IN THE DRAWINGS

For a further understanding of the above and other features and advantages, reference is made to the following detailed description of the preferred embodiment and the drawings, in which:

FIG. 2 is a more detailed schematic of the network illustrating features of an interface between master devices and slave devices;

FIG. 3 is a timing diagram showing the protocol of the interface for data storage transfers;

FIG. 4 is a timing diagram illustrating the protocol of the interface for return data transfers;

DETAILED DESCRIPTION OF THE PREFERRED EMBODIMENTS

Figure 1:
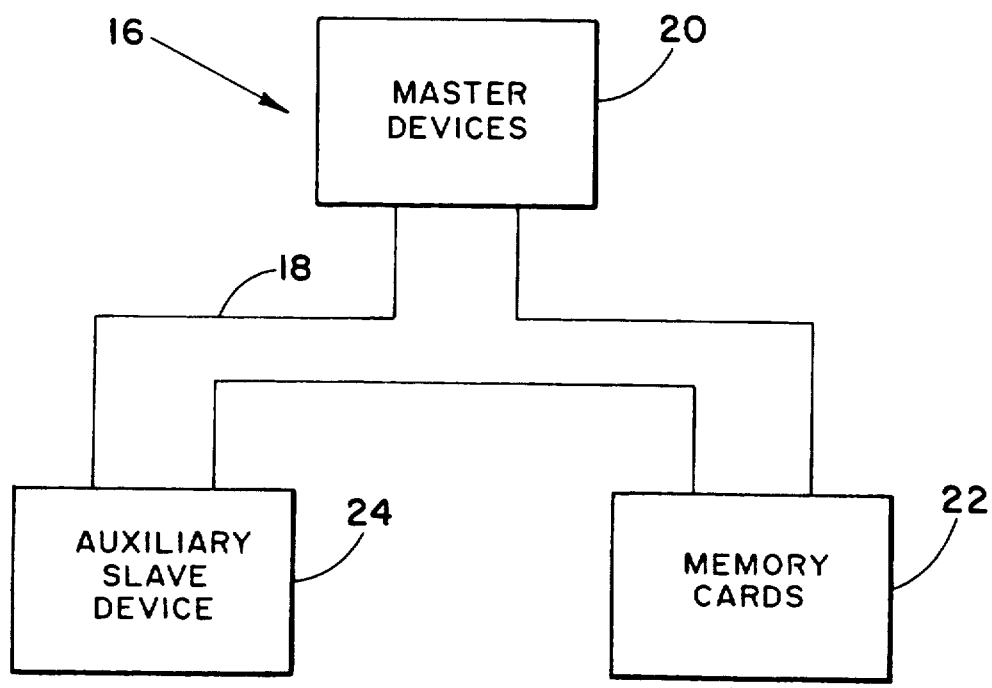
FIG. 1 is a schematic illustration of an information processing network configured in accordance with the present invention.

Turning now to the drawings, there is shown in FIG. 1 an information processing network 16 including a set of master devices, a set of slave devices, and an interface 18 between these respective sets. The master set includes a plurality of main processors 20. The set of slave devices includes main storage, including a plurality of memory cards 22. The slave devices further include an auxiliary slave device 24, which can be, for example, an I/O device, a vector processor, an auxiliary processor, etc. Networks such as a network 16 may include a plurality of auxiliary slave devices, or alternatively no such devices. In any event the network includes at least one master device and at least one slave device.

Network 16 is shown in more detail in FIG. 2. The master set includes "N" processors, with the first and second processors shown at 26 and 28, respectively. Processor 26 includes arbitration logic 30, and processor 28 includes substantially identical arbitration logic 32. The remaining processors likewise include the arbitration logic. Each of the processors is connected to all of the remaining processors in point-to-point fashion, i.e. by multiple lines. A set of such lines links the arbitration logic circuitry in each processor with the corresponding circuitry in each of the other processors. These lines are labeled 2-N for the first processor and 1 and 3N in the second processor. Each of the processors further includes interface control logic for use in distributing control of interface 18 among the processors and slave devices, as indicated at 34 and 36 in connection with processors 26 and 28, respectively.

The processing devices share interface 18 with "X" slave devices, four of which are illustrated at 38, 40, 42 and 44. Slave device 38 includes interface control logic circuitry 46, with slave devices 40-44 including substantially identical interface control logic circuitry at 48, 50 and 52. Slave device 38 further includes memory arrays, indicated at 54, for storing bit-encoded data, and a buffer 56 for intermediate storage of working data received from interface 18, and for loading data retrieved from the arrays for transmission. Similar memory arrays 58, 60 and 62 and buffers 64, 66 and 68 are part of slave devices 40, 42 and 44, respectively.

Interface 18 is shared in common by all of the master devices and all of the slave devices, for transmitting working information between individual master and slave devices, typically for manipulation within a master device or storage within a slave device. The interface further accommodates transmissions of control, address and status information, all of which concern the handling of the working information.

Interface 18 includes three busses for data transmissions, including a data bus 70 for transmitting working information, a command/address bus 72 for transmitting store and fetch commands, address information and the number of data bytes involved, and a communication bus 74 for transmitting status information.

Interface 18 further includes a series of lines for passing control of the interface among the master devices and slave devices. These include a grant token 76, which is a single line shared in common by all devices, and a series of "X" select tokens, each uniquely associated with one of the slave devices and connected to all of the master devices. The select token connected to slave device 38 is shown in detail to reveal that it consists of three lines: a command active line 78, a return data line 80 and a buffer full or buffer occupied line 82.

The interface lines making up the select tokens transmit data bus control signals between the master devices and slave devices, for passing control of data bus 70 among these devices. Grant token 76 is a single line connected to each of the master and slave devices for bidirectional transmission. In other words, each of the master and slave devices can either drive the grant token, or receive signals from the grant token.

When a device is sending working information to another one of the devices over data bus 70, it controls the data bus to the exclusion of all other devices. This device, for convenience designated the "currently controlling" device, maintains control of bus 70 by providing a data bus hold signal via grant token 76 to the other devices. More particularly, grant token 76 must be active in order to permit the select tokens to shift data bus control to one of the other devices. Thus, the currently controlling device maintains control by deactivating, and maintaining inactive, the grant token. However, when the currently controlling device reaches the final cycle of its operation, i.e. its transmission of working data, this device activates the grant token. This is done e.g. by changing the logic level of the signal to the grant token from a "0" to "1". Activation of grant token 76 is a signal to all devices that the currently controlling device is on the final cycle of its operation, which frees the interface for the following cycle. During the final cycle of the current operation, the select tokens shift control of data bus 70 to the next one of the devices, so that the next device can provide data to data bus 70 immediately upon completion of the current transmission.

The individual lines making up each of the select tokens transmit data bus control signals unidirectionally. Considering the select token associated with slave device 38 for example, command active line 78 for a store command transmits a "command active" signal from any of the master devices to slave device 38, signalling that a selected one of the master devices has been granted control of the data bus for the next operation. Return data line 80 also transmits a control signal from any of the master devices to slave device 38, in this instance indicating that control of data bus 70 is being passed from the selected master device to slave device 38 for sending data to the selected master via the data bus. Buffer occupied line 82 is also unidirectional, but transmits a buffer-full signal from slave device 38 to all of the master devices. This signal indicates that slave device 38, typically because buffer 56 is occupied, will not accept commands from any of the master devices, either to receive data from a master device for storage, or to retrieve data from arrays 54 into its buffer for later transmission to a selected master device.

The remaining select tokens are substantially identical. In general, each command active line is driven from a selected master device to the slave device uniquely associated with the select token. Each return data line is likewise driven from a selected master device to a unique slave device, and instructs the slave device to send previously requested data to the selected master device on the following cycle. Data bus control signals provided over the command active and return data lines are of course valid only if the grant token is active. If the grant token is being held inactive by a currently controlling device, such signals are ignored and must be reissued by the selected master device, to become effective when issued with the grant token active. Each buffer full line is driven from its uniquely associated slave device to all of the master devices. When this line is active, the associated slave does not accept commands, regardless of the state of any of the other lines.

Data bus 70 is bidirectional. It is the exclusive conduit for working information, and transmits only working information. All of the master devices and slave devices are connected to bus 70 for transmissions, so that each of the devices can drive bus 70 when controlling it and transmitting working information, and further can receive working information transmitted from another device. Data bus 70 preferably is able to transmit up to eight data bytes in parallel, although the capacity of this bus may be varied to suit the needs of particular networks.

Command/address bus 72 transmits information from a selected master device to a selected slave device. The information includes a command (i.e. store or fetch), a byte-aligned start address at which data is located or data is to be stored, and the length of the address in terms of the number of bytes involved. The slave devices receive but do not send this information. The bidirectional connection of the master devices with bus 72 enables each master device, when providing command and address information to bus 72, to inform the other master devices as to the length and address of the access.

Communication bus 74 is common to all master and slave devices, and functions in parallel with data bus 70 and command/address bus 72. The communication bus is driven from the slave devices to the master devices, and provides the communication link between the master and slave devices which adds intelligence to the interface. Communication bus 74 operates under three protocols to transfer information, with the current protocol determined by the data bus control signals issued on the previous cycle and the grant token of the current cycle.

Under the first protocol, a slave device controlling data bus 70 and transmitting working information to one of the master devices, simultaneously transmits status information to that master device. The status information is related to the working information being simultaneously transmitted, and identifies the working information as good, bad or corrected. This protocol is valid if the slave device controls the interface (i.e. data bus 70) to return data and is currently activating grant token 76.

Under the second protocol, a selected slave device notifies a master device that it needs service, i.e. is subject to internal error, trap condition, etc. This protocol is valid when the slave device controls interface 18 to return data, but has not activated the grant token, indicating that the slave device is not yet returning control of the interface.

The third protocol is optional, and is used by a slave device to notify a processor or other master device either that it has received a command or has not received the command (e.g. card busy), the command having been sent by the master device during the previous clock cycle. Further under this protocol, the slave device may provide a message that service is needed. This protocol is valid during the cycle following activation of the associated command activate line and the grant token.

Transfers between the master devices and slave devices are either store operations in which data from a master device is transferred to a slave device for storage, or fetch operations in which data stored in one of the sleeve devices is transmitted to the master device requesting the data. Store and fetch operations are conducted according to two protocols of interface 18, one for command transfers and one for return data transfers.

The command transfer protocol is illustrated in FIG. 3, and can apply either to a store operation or the initial stage of a fetch operation. During the initial clock cycle of a command transfer, a selected master device active the command activate line and the grant token, and simultaneously provides a command to a selected slave device via command/address bus 72. If the command is part of a store operation, working data is sent from the master device to the slave device via data bus 70 during the next subsequent clock cycle. Further, if the optional acknowledge protocol is used, the slave device sends an acknowledgement to the master device that the store command was received, over communication bus 74.

Under the return data transfer protocol in FIG. 4, a selected master device activates the return data line associated with a selected slave device, as well as grant token 76, unless the grant token is being controlled by another slave device. Control of the grant token is transferred to the slave device. The slave device maintains the grant token activate, transfers requested data to the master device over data bus 70, and simultaneously transfers related status information to the master device via the communication bus.

Each storage operation involves a command transfer, with a command involved being a store command. Fetch operations occur in three stages. First, a fetch command is sent from the master device to the slave device under the command transfer protocol, with a difference from FIG. 3 in that no data is transferred over the interface during the next subsequent clock cycle. During the second stage of a fetch operation, the slave device, responsive to the fetch command, retrieves the requested data from its memory arrays and transfers the retrieved data into its buffer. In the third stage, the previously buffered data is transmitted to the master device, responsive to activation of the associated return data line by the master device and the accompanying transfer of bus control to the slave device.

In connection with FIGS. 3 and 4, it is noted that the particular master device to issue the store command and activate the command active line, or alternatively the master device that activates the return data line, is selected pursuant to an arbitration scheme not in itself germane to the present invention, but selected from a number of arbitration schemes known to those skilled in the art and used in cooperation with the present invention.

Figure 5:
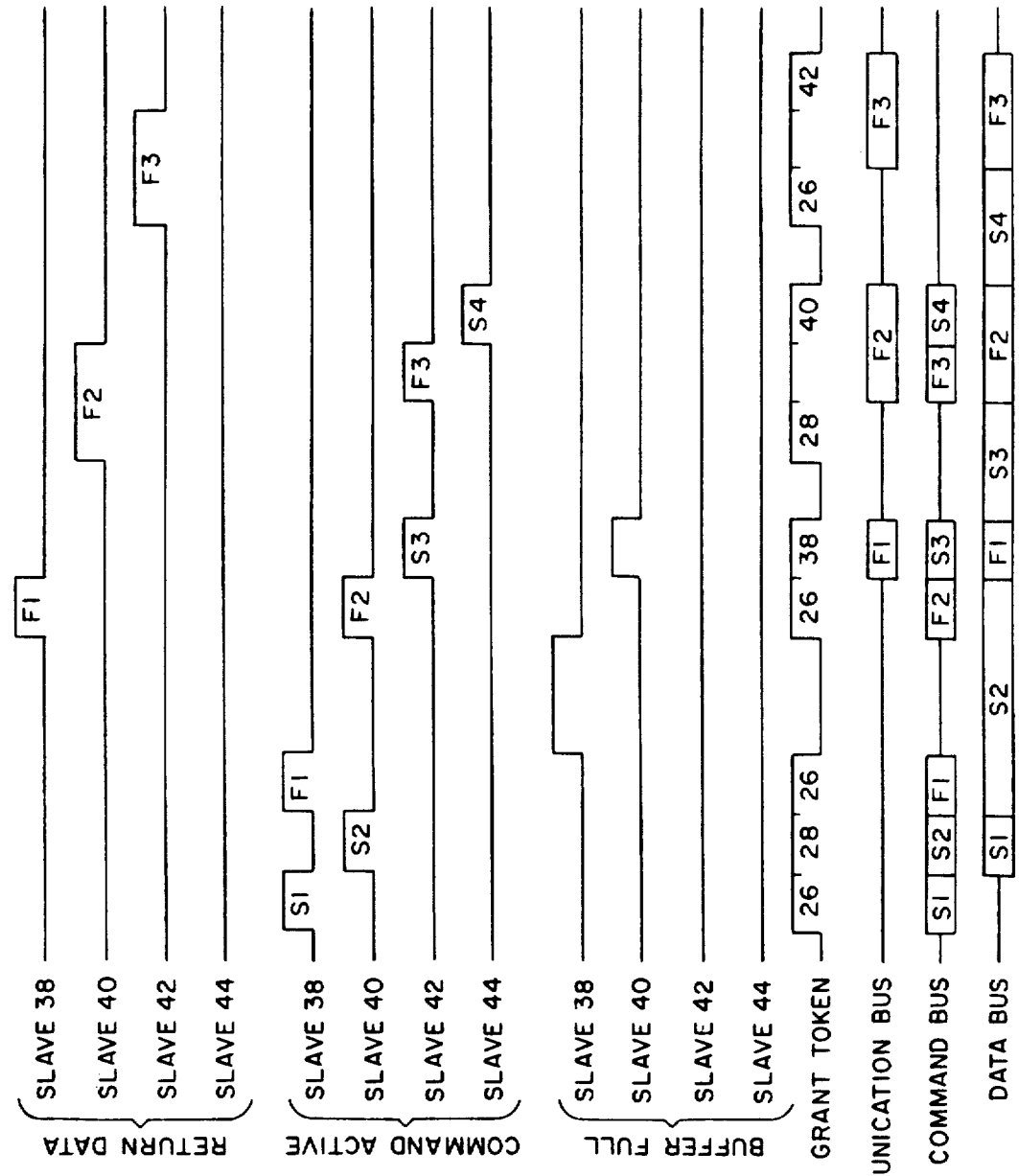
FIG. 5 is a timing diagram illustrating a sequence of storage and data fetch operations according to the interface protocols.

A salient feature of the present invention is increased efficiency of the interface, principally due to more effective use of data bus 70. FIG. 5 illustrates a series of command and return data transfers over fifteen clock cycles, in which the use of data bus 70 after the first clock cycle is 100 percent. The timing diagram illustrates transmissions between master devices 26 and 29, and slave devices 38, 40 42 and 44, connected to one another through the interface. With this in mind, a cycle by cycle description runs as follows:

1. Master device 26 sends a store command to slave device 38 via bus 72. Master device 26 controls grant token 76.

2. Master device 28 sends a store command to slave device 40 and gains control of the grant token. Master device 26 sends working information to slave device 38 via data bus 70.

3. Master device 26 issues a fetch command to slave device 38 via bus 70, and it activates the associated command active line. Master device 26 regains control of the grant token. Slave device 40 begins to accept data from master device 28.

4. Slave device 38, responsive to the fetch command in cycle 3, has loaded data into its buffer and provides a buffer full signal to the master devices. Slave device 40 continues to accept data from master device 28.

5. A continuation of cycle 4.

6. Master device 26 activates the return data line associated with slave device 38. Simultaneously, master device 26 issues a fetch command to slave device 40. Slave device 40 completes its acceptance of data from master device 28.

7. Master device 28 issues a store command to slave device 42 and activates the corresponding command active line. Slave device 40 issues the buffer occupied signal, due to the fetch command received on the previous cycle. Because the return data line became active in cycle 6, control of the grant token is shifted from master device 26 to slave device 38. This slave device also controls data bus 70 for transmitting working information to master device 26, and controls communication bus 74 to simultaneously convey status information.

8. Slave device 42 begins accepting data from a master device 28.

9. Master device 28 activates the return data line of slave device 40. Master device 28 controls the grant token, as slave device 42 completes its acceptance of data from master device 28.

10. Master device 28 maintains the return data line of slave device 40 active for another cycle, because more data is being returned. Slave device 40 controls the grant token. Master device 26 issues a fetch command to slave device 42.

11. Master device 26 issues a store command to slave device 44, and activates the appropriate command active line. Slave device 40 completes its transmission of working data and status information to master device 28.

12. Slave device 44 begins accepting data from master device 26.

13. Master device 26 activates the return data line of slave device 42, and controls the grant token. Slave device 44 completes acceptance of data from master device 26.

14. Master device 26 continues to activate the data return line of slave device 42 and passes control of the grant token to the slave device 42, whereupon this slave device will complete transmission of working information and status information to master device 26.

15. Slave device 42 activates grant token 76 and completes the transfer of working and status information.

Figure 6:
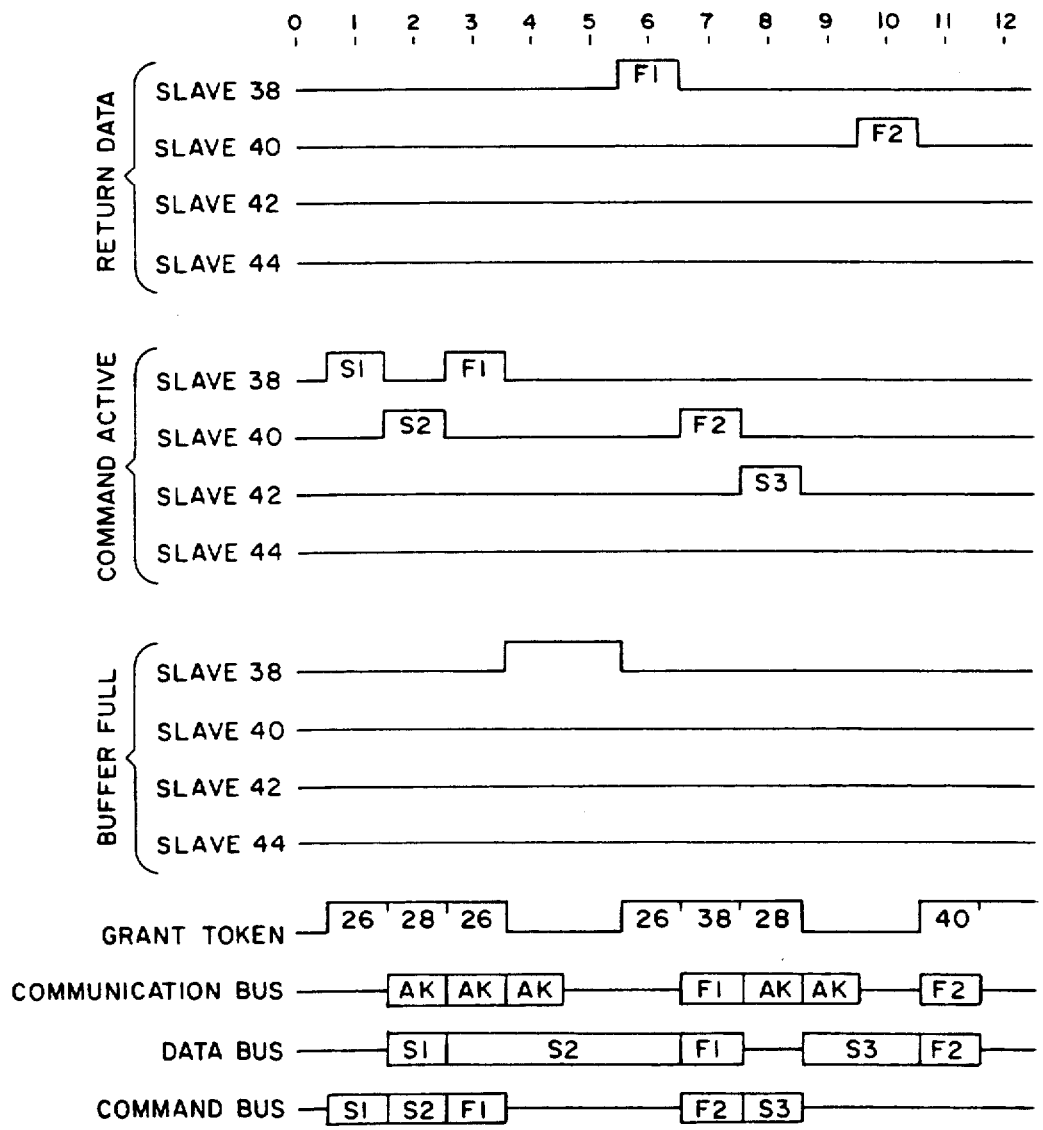
FIG. 6 is a timing diagram illustrating a sequence similar to that of FIG. 5, but including the acknowledgement feature of the protocol illustrated in FIG. 3.

FIG. 6 illustrates a timed sequence of operations similar to those in FIG. 5, but with the optional acknowledgement protocol. Accordingly, communication bus 74 transfers not only status information, but acknowledgements from the slave devices to the master devices that commands have been received. In clock cycles 2 and 3, slave devices 38 and 40 acknowledge "store command received" to master devices 26 and 28, respectively. In clock cycle 4, slave device 38 acknowledges to master device 26 its receipt of the fetch command issued in the previous cycle.

From a comparison with FIG. 5, it is seen that the acknowledgement protocol slightly reduces the efficiency of the interface. With command acknowledgement, command bus 72 waits for an available free cycle on data bus 70 before a command can be sent. This is because communication bus 74 always is tied to the data bus under this protocol, so that status of data is returned simultaneously with the working data. In particular, the fetch command from master device 26 to slave device 40, occurring in cycle 6 with no acknowledgement (FIG. 5), does not occur in FIG. 6 until clock cycle 7. With status information already being transmitted by slave device 38 during clock cycle 7, the communication bus is unavailable during this cycle for transmission of an acknowledgement of a command received in cycle 6.

Without such acknowledgement, transfers other than store commands are made on the command bus independently of data bus traffic. The command is assumed to be accepted if the grant token is active and the buffer full line is inactive. The particular memory card or other slave device involved is unable to respond with error messages to the processor until the next time it controls the communications bus. Thus, the advantage of the acknowledgement protocol, despite slightly reduced performance, is earlier error detection.

Figure 7:
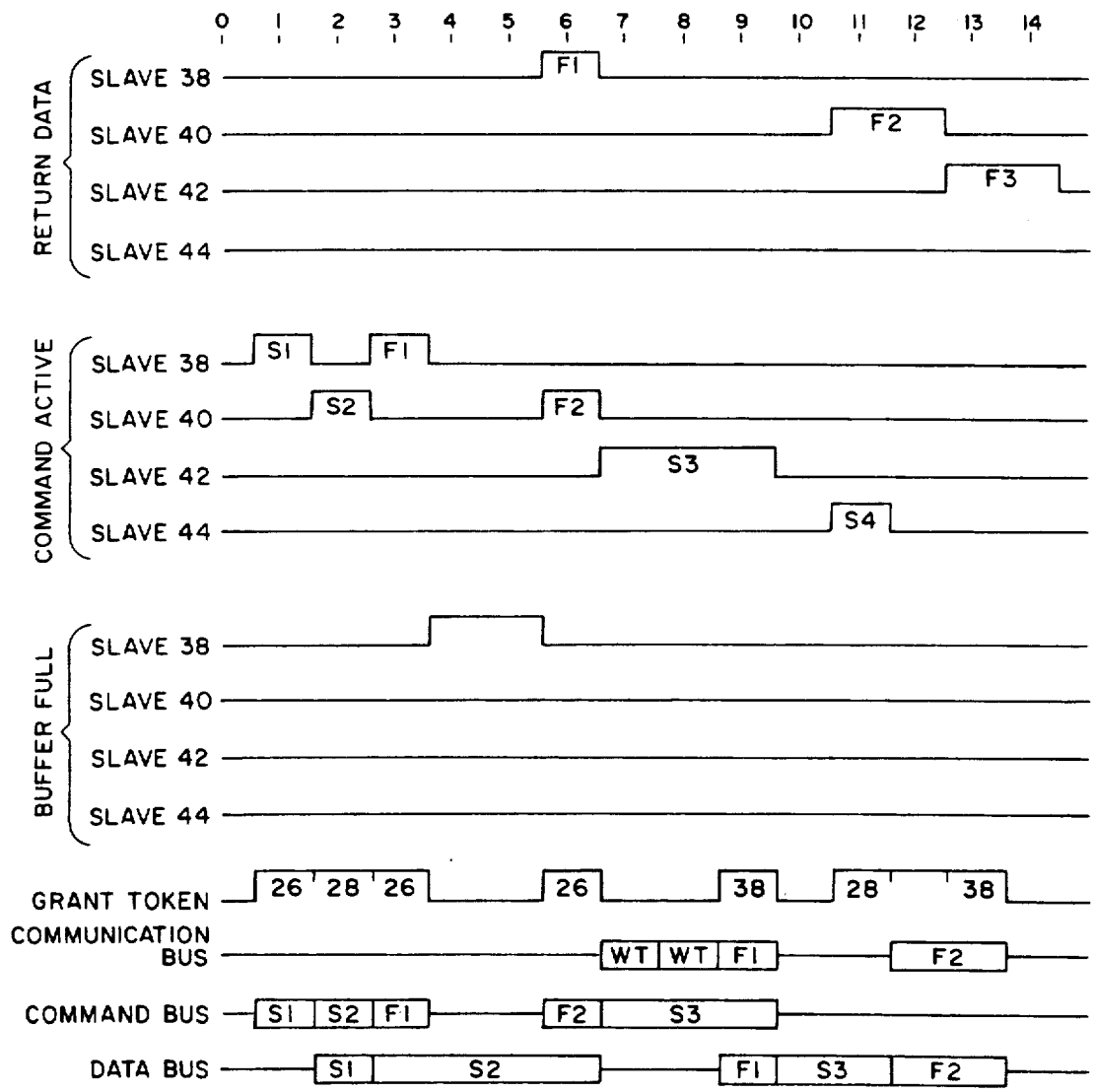
FIG. 7 is a timing diagram showing a sequence similar to that of FIG. 5, but with a memory card of the network occupied.

The timing diagram in FIG. 7 illustrates the situation in which one of the slave devices has been enabled to return or send data to a selected master device, but is unable to return data, perhaps because the data has not yet been retrieved from the memory card data arrays. In this event, actuation of the associated return data line transfers control of data bus 70 from the selected master to the selected slave, as before. The slave device simply maintains control of the grant token, holding the grant line inactive until the slave device can transmit the requested data. In FIG. 7, this sequence of events is illustrated in connection with master device 26 and slave device 38. The corresponding return data line is activated in clock cycle 6. Slave device 38, in control of the grant token during cycles 7-9, transmits an appropriate signal pursuant to the second of the three protocols discussed above in connection with communication bus 74. This protocol is valid, as slave device 38 controls data bus 70 but has not activated the grant token. In clock cycle 9, slave device 38 activates the grant token and transfers the requested working information to master device 26 via data bus 70. While slave device 38 controls the grant token, master device 28 is unable to obtain control for transferring data to slave device 42. Thus, master device 28 continues to issue a store command, and maintains the associated command active line active in cycles 6-9 until slave device 38 raises the grant token to complete both the command from master 28 to salve 42 and the data transfer from slave 38 to master 26.

Thus, in accordance with the present invention, multiple processors and I/O devices can share the same data bus to main storage, with total system performance substantially enhanced through effective use of the data bus. While devices configured as masters require both arbitration and bus sharing logic, the slave devices need only the bus sharing logic to distribute control of the data bus among all master and slave devices. The use of the additional command/address bus and communication bus in parallel with the data bus, with an interface protocol selection of the next interface controller during a current transmission, substantially enhances use of the working data bus. The transfer of certain logic functions from master processors to slave memory cards, and a data fetch protocol which frees the busses for unrelated transfers during one stage of the fetch operation, further enhance bus utilization.

What is claimed is:

1. An information processing system including:
a plurality of devices for transmitting and receiving bit-encoded information, comprising a first set of devices including at least one master device, a second set of devices including at least one slave device, and an interface between the first and second sets of devices, wherein the interface includes:
(a) a first data bus shared by said plurality of devices for carrying out transmissions of the bit-encoded information between the first and second sets of devices, each of the devices exclusively controlling the first data bus when providing bit-encoded information to the first data bus during one of said transmissions;
(b) a bidirectional signal conveyance means connected to the first and second sets of devices, for transmitting a data bus hold signal from one of the devices currently in control of the first data bus, to the others of said devices, thereby to prevent another one of the devices from controlling the first data bus until the currently controlling device has completed one of said transmissions; and
(c) a selection means, connected to the first and second sets of devices, for transmitting control signals, each from a selected one of the master devices to a selected one of the slave devices, thereby to transfer control of the first data bus to one of the devices after said currently controlling device completes said one transmission, said control signals including:
a first control signal, operative after termination of the data bus hold signal, to allow transfer of control of the first data bus, enabling the selected master device to transmit bit-encoded information to a selected slave device over the first data bus; a second control signal to enable a selected slave device to buffer bit-encoded information for subsequent transmission thereof from the selected slave device to a selected master device; and a third control signal, operative after termination of the data bus hold signal to pass control of the first data bus to the selected slave device via the selected master device, for transmission of the previously buffered bit-encoded information to the selected master device.

2. The information processing network of claim 1 wherein:
said interface further includes a second data bus for transmissions of bit-encoded control and address information, said second bus shared by the plurality of devices and operating in parallel with the first data bus.

3. The network of claim 2 wherein:
said first set includes a plurality of master devices, at least several of the master devices being processors, and the second set includes a plurality of slave devices, at least several of the slave devices being memory cards.

4. The apparatus of claim 3 wherein:
said signal conveyance means comprises a single line grant token connected in common to said plurality of devices.

5. The network of claim 4 wherein:
said selection means comprises a plurality of select tokens, each of the select tokens unique to one of the slave devices and connected between its associated slave device and all of the master devices.

6. The network of claim 5 wherein:
each of the select tokens includes a command active line for transmitting the first and second control signals, and a return data line for transmitting the third control signal.

7. The network of claim 6 wherein:
the master devices, slave devices and interface operate according to a predetermined clock cycle and the first control signal is generated by a selected master device and provided to a selected slave device over an associated command active line during a designated one of said clock system, a store command including destination address information is generated by the selected master device and provided to the selected slave device over the second data bus during the designated cycle, and wherein bit-encoded information is transmitted from the selected master device to the selected slave device over the first data bus during the next clock cycle following the designated clock cycle.

8. The network of claim 7 wherein:
said second and third control signals comprise portions of a data fetch sequence occurring in three consecutive stages including a first stage during which the second control signal is generated by a selected master device and provided to a selected sleeve device over an associated command active line and during which the selected master device issues a fetch command including address information to said selected slave device over the second data bus, a second stage during which the slave device, response to the second control signal, buffers selected bit-encoded information, and a third stage during which the selected slave device, responsive to receiving the third control signal from the selected master device, transmits the buffered bit-encoded information over an associated return data line to the selected master device.

9. The network of claim 8 wherein:
said first and second data busses, during said second stage, are available to transmit information other than information involved in said data fetch sequence.

10. The network of claim 6 wherein:
each of the select tokens further includes a buffer-full line for transmitting a signal from the associated slave device to each of the master devices indicating that a buffer of the associated slave device is occupied, to prevent the selected slave device from accepting the first commands or the second commands from any of the master devices.

11. The network of claim 10 wherein:
each of said select tokens consists of one of the command active lines, one of the return data lines and one of the buffer-occupied lines.

12. The network of claim 3 wherein:
the master devices, slave devices and interface operate according to a predetermined protocol wherein a selected master device provides the first control signal to a selected slave device over the selection means and simultaneously provides a store command including destination address information to the selected slave device over the second bus, and wherein bit-encoded information is transferred from the selected master device to the selected slave device immediately following the transfers of the first control signal and store command.

13. The network of claim 12 wherein:
the second and third control signals comprise portions of a data fetch protocol in three stages including a first stage during which the selected master device provides a fetch command to a selected slave device over the second bus and simultaneously provides the second control signal to the selected slave device over the selection means, a second stage during which the selected slave device buffers bit-encoded information, and a third stage during which the selected slave device, responsive to receiving the third control signal from the selected master over the selection means, transmits the buffered bit-encoded information to the selected master over the first data bus.

14. The network of claim 13 wherein:
the first and second data busses, during said second stage, are free to transmit information other than information related to the fetch protocol.

15. The data processing network of claim 2 further including:
a third data bus shared by said plurality of devices and operating in parallel with the first and second data busses, for transmission of bit-encoded status information from the second set of devices to the first set of devices.

16. The network of claim 15 wherein:
said status information corresponds to bitencoded information transmitted from a selected slave device to a selected master device when the selected slave device controls the first bus, said selected slave device also controlling the third data bus to transmit the bit-encoded information and associated status information simultaneously.

17. The network of claim 15 wherein:
said status information includes an acknowledgment that command and address information was received by the selected slave from a selected master over the second data bus, said acknowledgment being sent to said selected master over the third data bus during the next clock cycle after the transfer of the command and address information.

18. The network of claim 2 wherein:
said selection means includes a first signal transmission means for transmitting the first and second control signals, and a second signal transmission means for transmitting the third control signals.

19. The network of claim 2 wherein:
the control and address information includes a bytealigned start address and a length of the address where data either is to be stored or fetched.

20. The information processing network of claim 1 wherein:
said selection means further includes a means for transmitting a buffer-full signal from a selected slave device to said first set of devices indicating that a buffer of the selected slave device is occupied, to prevent the selected slave device from accepting any of the first or second control signals.

21. In a data processing system including a plurality of master devices including at least one processing device, a plurality of slave devices including at least one memory card, and an interface between the master devices and slave devices including a first data bus shared by the master devices and slave devices for transmitting bit-encoded information between the master devices and slave devices, a process for transferring exclusive control of the first data bus among the master devices and slave devices, including the steps of:
transmitting a data bus hold signal from one of the devices when currently in control of the first data bus, to the others of said devices, thereby to prevent another one of the devices from controlling the first data bus until the currently controlling device has completed a current transmission of the working information over the first data bus;
transmitting control signals, each from a selected one of the master devices to a selected one of the slave devices, over a selection means connected to the master devices and slave devices, thereby to transfer control of the first data bus to one of the devices after the currently controlling device completes the current transmission, said transfers of control each including one of the alternative steps of:
(a) storing data by transmitting a first control signal operative after termination of the data bus hold signal, to transfer control of the first bus to a selected master device, enabling the selected master device to transmit bitencoded information to a selected slave device over the first data bus; and
(b) fetching data by transmitting a second control signal to enable a selected slave device to buffer bitencoded information for subsequent transmission thereof from the selected slave device to a selected master device, and transmitting a third control signal, operative after termination of the data bus hold signal, to transfer control of the first data bus to the selected slave device via the selected master device, for transmission of the previously buffered bit-encoded information to the selected master device.

22. The process of claim 21 wherein:
said step of transferring control of the first data bus includes the step of transmitting the first control signal, or alternatively the step of transmitting the second and third control signals, while the currently controlling device controls the first data bus.

23. The process of claim 22 wherein;
the selection means includes a plurality of select tokens, each of the select tokens unique to one slave device and connected between its associated slave device and all master devices, each of the select tokens including a command active line and a return data line, and wherein the storing step includes:
transmitting the first control signal from a selected master device to a selected slave device over an associated command active line during a designated clock cycle, providing a store command from the selected master device to the selected slave device during the designated clock cycle and over a second data bus connected to all of the devices in parallel with the first data bus, and transmitting bit-encoded information during the next clock cycling after the designated clock cycle, from the selected master to the selected slave device over the first data bus.

24. The process of claim 23 wherein:
said data fetching step includes providing a fetch command including address information from a selected master device to a selected slave device over the second data bus and simultaneously providing the second control signal from the selected master to the selected slave device over an associated command active line;

buffering selected bit-encoded information in the selected slave device responsive to receiving the second control signal; and responsive to receiving the third control signal from the selected master device over an associated return data line, transmitting the buffered bit-encoded information over the second data bus to the selected master device from the selected slave device.

25. The process of claim 24 further including the step of:

transmitting bit-encoded status information from the selected slave device to the selected master device, simultaneously with said transmission of the buffered bit-encoded information.

26. The process of claim 22 including the further step of:

transmitting a buffer-full signal from a selected slave device to all of the master devices, over the selection means, to indicate that a buffer of the selected slave device is occupied, thereby to prevent the selected salve device from accepting any of the first and second control signals.

* * * * *

UNITED STATES PATENT AND TRADEMARK OFFICE
CERTIFICATE OF CORRECTION

PATENT NO. : 5,131,085
DATED : July 14, 1992
INVENTOR(S) : Richard G. Eikill and Sheldon B. Levenstein It is certified that error appears in the above-indentified patent and that said Letters Patent is hereby corrected as shown below:

Column 12, Claim 7, Line 7, "system" should read -- cycles --.

Column 12, Claim 8, Line 7, "sleeve" should read -- slave --.

Column 13, Claim 16, Line 2, "bitencoded" should read -- bit-encoded --.

Column 13, Claim 19, Line 2, "bytea-" should read -- byte-a --.

Column 14, Claim 21, Line 25, "bitencoded" should read -- bit-encoded --.

Column 14, Claim 21, Line 29, "bitencoded" should read -- bit-encoded --.

Column 16, Claim 26, Line 7, "salve" should read -- slave --.

Signed and Sealed this

Twenty-fourth Day of August, 1993

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,131,085
DATED : July 14, 1992
INVENTOR(S) : Richard G. Eikill and Sheldon B. Levenstein It is certified that error appears in the above-identified patent and that said Letters Patent is hereby corrected as shown below:

Column 12, Claim 7, line 7, "system" should read -- cycles --.

Column 12, Claim 8, line 7, "sleeve" should read -- slave --.

Column 13, Claim 16, line 2, "bitencoded" should read -- bit-encoded --.

Column 13, Claim 19, line 2, "bytea-" should read -- byte-a --.

Column 14, Claim 21, line 25, "bitencoded" should read -- bit-encoded --.

Column 14, Claim 21, line 29, "bitencoded" should read -- bit-encoded --.

Column 16, Claim 26, line 7, "salve" should read -- slave --.

Signed and Sealed this

Fifteenth Day of March, 1994

Attest:

BRUCE LEHMAN

*Attesting Officer*  *Commissioner of Patents and Trademarks*